US010204012B2

(12) United States Patent
Huang

(10) Patent No.: US 10,204,012 B2
(45) Date of Patent: Feb. 12, 2019

(54) IMPACT ANALYSIS-BASED TASK REDOING METHOD, IMPACT ANALYSIS CALCULATION APPARATUS, AND ONE-CLICK RESETTING APPARATUS

(71) Applicant: Huawei Technologies Co., Ltd., Shenzhen (CN)

(72) Inventor: Hongli Huang, Nanjing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/637,432

(22) Filed: Jun. 29, 2017

(65) Prior Publication Data
US 2017/0300385 A1 Oct. 19, 2017

Related U.S. Application Data

(63) Continuation of application No. PCT/CN2015/083998, filed on Jul. 14, 2015.

(30) Foreign Application Priority Data

Dec. 31, 2014 (CN) .......................... 2014 1 0856064

(51) Int. Cl.
G06F 11/14 (2006.01)
G06F 17/30 (2006.01)
(Continued)

(52) U.S. Cl.
CPC ........ *G06F 11/1438* (2013.01); *G06F 9/4494* (2018.02); *G06F 9/485* (2013.01);
(Continued)

(58) Field of Classification Search
CPC ........................................... G06F 9/4494–9/52
See application file for complete search history.

(56) References Cited

U.S. PATENT DOCUMENTS 5,590,277 A * 12/1996 Fuchs ................. G06F 11/1438
714/16
7,334,222 B2 * 2/2008 Keller ..................... H04L 41/06
717/135
(Continued)

FOREIGN PATENT DOCUMENTS

CN 101388038 A 3/2009
CN 101477543 A 7/2009
(Continued)

OTHER PUBLICATIONS

Law et al., Whole Program Path-Based Dynamic Impact Analysis, published by IEEE, 2003, pp. 308-318.*
(Continued)

*Primary Examiner* — Thuy Dao
*Assistant Examiner* — Zheng Wei
(74) *Attorney, Agent, or Firm* — Conley Rose, P.C.

(57) ABSTRACT

An impact analysis-based task redoing method using an impact analysis calculation apparatus and a one-click resetting apparatus includes receiving an impact analysis request, where the impact analysis request includes a source procedure identifier, an impact start time, and an impact end time; obtaining a dependency list and a procedure information list of a source procedure according to the source procedure identifier; obtaining a period of the source procedure and a period of a target procedure according to the source procedure identifier and the target procedure identifier in the dependency list; obtaining, according to the period of the source procedure, the period of the target procedure, the impact start time, and the impact end time, a procedure instance list corresponding to each procedure identifier included in the procedure instance list; and sending the procedure instance list and the procedure information list.

13 Claims, 3 Drawing Sheets

(51) Int. Cl.
*G06F 9/48* (2006.01)
*G06F 9/50* (2006.01)
*G06F 9/44* (2018.01)
*H04L 29/08* (2006.01)
*G06F 9/448* (2018.01)

(52) U.S. Cl.
CPC .......... *G06F 9/5038* (2013.01); *G06F 9/5088* (2013.01); *G06F 17/30563* (2013.01); *H04L 67/325* (2013.01); *G06F 2201/80* (2013.01)

(56) References Cited

U.S. PATENT DOCUMENTS

| | | | |
|---|---|---|---|
| 7,702,766 B2* | 4/2010 | Weir | G06F 9/542 709/223 |
| 7,779,298 B2* | 8/2010 | Challenger | G06F 11/1482 714/13 |
| 8,549,241 B2* | 10/2013 | Scales | G06F 11/1438 711/154 |
| 8,831,864 B1* | 9/2014 | Chen | G08G 5/06 701/118 |
| 8,868,506 B1* | 10/2014 | Bhargava | G06F 17/30011 707/648 |
| 8,869,163 B2* | 10/2014 | Toukmaji | G06F 9/4881 715/779 |
| 9,202,188 B2* | 12/2015 | Chen | G06Q 10/06 |
| 9,460,171 B2* | 10/2016 | Marrelli | G06F 17/30569 |
| 9,519,695 B2* | 12/2016 | Sampathkumaran | G06F 17/30563 |
| 9,621,679 B2* | 4/2017 | Kawagata | H04L 67/42 |
| 2002/0078432 A1* | 6/2002 | Charisius | G06Q 10/06 717/102 |
| 2004/0117046 A1* | 6/2004 | Colle | G06Q 10/06 700/99 |
| 2004/0133889 A1* | 7/2004 | Colle | G06Q 10/06 718/100 |
| 2004/0158568 A1* | 8/2004 | Colle | G06Q 10/06 |
| 2007/0083730 A1* | 4/2007 | Vorbach | G06F 9/3897 712/10 |
| 2007/0266383 A1* | 11/2007 | White | G06F 9/4856 718/1 |
| 2008/0059967 A1 | 3/2008 | Matsui et al. | |
| 2008/0221952 A1* | 9/2008 | Mohri | G06Q 10/06 705/7.11 |
| 2008/0222634 A1* | 9/2008 | Rustagi | G06F 9/5038 718/100 |
| 2008/0229140 A1* | 9/2008 | Suzuki | G06F 11/2082 714/2 |
| 2008/0307258 A1* | 12/2008 | Challenger | G06F 11/1438 714/20 |
| 2009/0037494 A1* | 2/2009 | Wong | G06F 17/30368 |
| 2009/0177671 A1 | 7/2009 | Pellegrini et al. | |
| 2009/0276449 A1 | 11/2009 | Syed et al. | |
| 2010/0070315 A1 | 3/2010 | Lu et al. | |
| 2010/0115048 A1* | 5/2010 | Scahill | H04L 67/322 709/213 |
| 2011/0035354 A1* | 2/2011 | Wan | G06F 17/30557 707/602 |
| 2011/0047525 A1 | 2/2011 | Castellanos et al. | |
| 2011/0107333 A1* | 5/2011 | Kapoor | G06Q 10/06 718/100 |
| 2011/0131448 A1* | 6/2011 | Vasil | G06F 9/5038 714/19 |
| 2011/0167196 A1* | 7/2011 | Scales | G06F 11/1438 711/6 |
| 2011/0276966 A1* | 11/2011 | Christensen | G06F 9/5038 718/100 |
| 2012/0185864 A1* | 7/2012 | Toukmaji | G06F 9/4881 718/104 |
| 2013/0145018 A1* | 6/2013 | Iizuka | G06F 11/0757 709/224 |
| 2013/0159197 A1* | 6/2013 | Singh | G06F 9/5038 705/301 |
| 2013/0232192 A1* | 9/2013 | Kawagata | H04L 67/42 709/203 |
| 2015/0058053 A1* | 2/2015 | De | G06Q 10/06311 705/7.13 |
| 2015/0067635 A1* | 3/2015 | Chen | G06Q 10/06 717/102 |
| 2017/0147594 A1* | 5/2017 | Huang | G06F 17/30117 |
| 2018/0089006 A1* | 3/2018 | Chen | G06F 11/0709 |

FOREIGN PATENT DOCUMENTS

| | | |
|---|---|---|
| CN | 101567013 A | 10/2009 |
| CN | 101587477 A | 11/2009 |
| CN | 102279888 A | 12/2011 |
| CN | 102332125 A | 1/2012 |
| CN | 102411599 A | 4/2012 |
| CN | 102981904 A | 3/2013 |
| EP | 1037147 A1 | 9/2000 |

OTHER PUBLICATIONS

Michael W. Shapiro, Self-Healing in Modern Operating System, published by QUEUE, Dec./Jan. 2004-2005, pp. 67-75 (Year: 2004).*
Huang et al., Precise Dynamic Impact Analysis with Dependency Analysis for Object-oriented Programs, published by IEEE, pp. 374-381 (Year: 2007).*
Denys Poshyvanyk, Using Information Retrieval to Support Software Maintenance Tasks, published by IEEE, Proc. ICSM 2009, Edmonton, Canada, pp. 453-456 (Year: 2009).*
Machine Translation and Abstract of Chinese Publication No. CN101388038, dated Mar. 18, 2009, 10 pages.
Machine Translation and Abstract of Chinese Publication No. CN101567013, dated Oct. 28, 2009, 10 pages.
Machine Translation and Abstract of Chinese Publication No. CN101587477, dated Nov. 25, 2009, 10 pages.
Machine Translation and Abstract of Chinese Publication No. CN102279888, dated Dec. 14, 2011, 11 pages.
Machine Translation and Abstract of Chinese Publication No. CN102411599, dated Apr. 11, 2012, 17 pages.
Yu, M., et al., "Self-Healing Workflow Systems under Attacks," XP10692690, Proceedings of the 24th International Conference on Distributed Computing Systems (ICDCS), 2004, 10 pages.
Foreign Communication From A Counterpart Application, European Application No. 15874827.7, Extended European Search Report dated Jul. 26, 2017, 10 pages.
Foreign Communication From A Counterpart Application, PCT Application No. PCT/CN2015/083998, English Translation of International Search Report dated Oct. 21, 2015, 3 pages.
Foreign Communication From A Counterpart Application, PCT Application No. PCT/CN2015/083998, English Translation of Written Opinion dated Oct. 21, 2015, 6 pages.
Machine Translation and Abstract of Chinese Publication No. CN102332125, dated Jan. 25, 2012, 17 pages.
Machine Translation and Abstract of Chinese Publication No. CN102981904, dated Mar. 20, 2013, 32 pages.
Foreign Communication From A Counterpart Application, Chinese Application No. 201410856064.1, Chinese Office Action dated Aug. 24, 2018, 4 pages.
Foreign Communication From A Counterpart Application, Chinese Application No. 201410856064.1, Chinese Search Report dated Jul. 25, 2018, 2 pages.

* cited by examiner

IMPACT ANALYSIS-BASED TASK REDOING METHOD, IMPACT ANALYSIS CALCULATION APPARATUS, AND ONE-CLICK RESETTING APPARATUS

CROSS-REFERENCE TO RELATED APPLICATIONS

This application is a continuation application of International Patent Application No. PCT/CN2015/083998, filed on Jul. 14, 2015, which claims priority to Chinese Patent Application No. 201410856064.1, filed on Dec. 31, 2014. The disclosures of the aforementioned applications are hereby incorporated herein by reference in their entireties.

TECHNICAL FIELD

The disclosure relates to the field of computers, and in particular, to an impact analysis-based task redoing method, an impact analysis calculation apparatus, and a one-click resetting apparatus.

BACKGROUND

In a big data service processing process, extract, transform, and load (ETL) is responsible for obtaining data from various data source systems and supports obtaining data from a database or a file system similar to a data source system, and logical processing such as conversion, cleaning, association, and gathering is performed by the ETL on the data, and then the data is loaded to a target system according to a service requirement.

A unified scheduling module of the ETL performs timing scheduling on a workflow and schedules and executes a task inside the workflow.

A dependency is implied between tasks in a same workflow, and different workflows and different workflow tasks also have mutual dependencies. Dependence herein mainly is data dependence. For example, a next task is executed only when a dependent task is processed completely.

A typical service scenario is described below. Procedure 1 is scheduled once each hour, procedure 2 needs to depend on procedure 1, and procedure 2 is executed only when data conversion and storage of the 24-hour procedure 1 succeeds. Procedure 3 depends on procedure 2, and procedure 3 is executed only after procedure 2 is successfully executed. Execution of procedure 4 is directly triggered after procedure 3 is executed completely. Dependence on and triggering of the foregoing tasks is basically data dependence. When dependent data changes and needs to be re-executed, correspondingly, a subsequent task is affected and execution of the subsequent task needs to be started from an appointed node in sequence.

In an operation and maintenance process, if it is found that original data of two days ago has a problem, the data needs to be retransmitted to a database of procedure 1; in this case, the retransmitted data needs to be reprocessed, and procedures of data directly depending on procedure 2 or indirectly depending on procedures 3 and 4 need to be rerun.

1. A procedure corresponding to the retransmitted data and a status of an affected task need to be reset, and then execution is recovered from an appointed task of the procedure.

2. Then a first layer of dependence is found according to a dependence configuration task in a procedure configuration, multiple procedures may be found, a corresponding period may be found for each procedure, a status is reset from an appointed task of a procedure, and then execution is recovered.

3. For each procedure found in 2, a subsequent first layer of dependent procedures or tasks are searched repeatedly, a corresponding period is found for each found procedure, status resetting is started from an appointed task of the procedure, and then execution is recovered.

4. The third step is repeated until all affected procedures are executed completely.

In the foregoing data processing process, the following problem exists. Basically, data collected from a data source is basic data. Therefore, the basic data or external data representation (XDR) data affects other subsequent procedures to some extents. In a particular domestic site, a quantity of procedures that are subsequently directly affected or indirectly affected by the most important procedure data A is more than 100. In this case, when procedure data A has a problem, after retransmission, a maintenance operation in one day is redoing corresponding tasks. Consequently, an operation thereof is excessively complex, and a maintenance difficulty is very high. In a maintenance process, a case of omission possibly exists, causing data results to be inconsistent. Because dependencies are complex, some tasks may not be reset due to carelessness during operations, causing data to be incomplete.

SUMMARY

To resolve the foregoing problem, an objective of the disclosure is to provide an impact analysis-based task redoing method capable of one-click redoing, an impact analysis calculation apparatus, and a one-click resetting apparatus.

According to a first aspect, the disclosure provides an impact analysis-based task redoing method, where the method is applied to an impact analysis calculation apparatus and includes receiving an impact analysis request, where the impact analysis request includes a source procedure identifier, an impact start time, and an impact end time; obtaining a dependency list and a procedure information list of a source procedure according to the source procedure identifier, where the dependency list includes a source procedure identifier, a target procedure identifier, and a subsequent procedure identifier, the procedure information list includes a source procedure identifier, a source task identifier, the target procedure identifier, the target task identifier, the subsequent procedure identifier, and a subsequent task identifier, a source task is a task included in a source procedure, a target procedure is a procedure directly affected by the source procedure or the source task, a target task is a task included in the target procedure, a subsequent procedure is a procedure directly affected by the target procedure or a task included in the target procedure, and a subsequent task is a task included in the subsequent procedure; obtaining a period of the source procedure and a period of the target procedure according to the source procedure identifier and according to the target procedure identifier in the dependency list; obtaining, according to the period of the source procedure, the period of the target procedure, the impact start time, and the impact end time, a procedure instance list corresponding to each procedure identifier included in the procedure instance list, where the procedure instance list includes a procedure name, a procedure identifier, a procedure instance identifier, an execution status, and a procedure start and end time, and the start and end time includes a start time and an end time; and sending the procedure instance list and the procedure information list.

In a first possible implementation manner of the first aspect, obtaining a dependency list and a procedure information list of a source procedure according to the source procedure identifier includes obtaining, according to the source procedure identifier, an impact relationship list of procedures and tasks that are affected by a source procedure from the impact start time to the impact end time, where the impact relationship list includes a source procedure identifier, a source task identifier, a target procedure identifier, and a target task identifier; obtaining a task impact list inside the source procedure according to the source procedure identifier, where the task impact list includes more than one source task identifier included in the source procedure; and obtaining the dependency list and the procedure information list of the source procedure according to the impact relationship list and the task impact list.

With reference to the first possible implementation manner of the first aspect, in a second possible implementation manner of the first aspect, obtaining a task impact list inside the source procedure according to the source procedure identifier, where the task impact list includes more than one source task identifier included in the source procedure includes obtaining task impact lists of the source task and a subsequent task, of the source task, inside the source procedure when the impact analysis request further includes a source task identifier, where the task impact list includes the source task identifier and the subsequent task identifier.

In a third possible implementation manner of the first aspect, obtaining, according to the period of the source procedure, the period of the target procedure, the impact start time, and the impact end time, a procedure instance list corresponding to each procedure identifier comprised in the procedure instance list includes obtaining an execution status of the source procedure and an execution status of the target procedure according to the impact start time and the impact end time of the source procedure when the period of the source procedure is the same as a period of the target procedure; obtaining an execution status of the source procedure and execution statuses of target procedures in periods of all the target procedures from the impact start time to a current moment according to the impact start time and the impact end time of the source procedure when the period of the target procedure is shorter than the period of the source procedure; or obtaining a data time of the target procedure and obtaining an execution status of the source procedure and an execution status of the target procedure at the data time according to the impact start time and the impact end time when the period of the target procedure is longer than the period of the source procedure.

In a fourth possible implementation manner of the first aspect, the sending the procedure instance list and the procedure information list includes sending the procedure instance list and the procedure information list to the one-click resetting apparatus, so that the one-click resetting apparatus redoes a task; or displaying the procedure instance list and the procedure information list.

According to a second aspect, the disclosure provides an impact analysis-based task redoing method, where the method is applied to a one-click resetting apparatus and includes obtaining a procedure instance list and a procedure information list of an impact analysis request from an impact analysis calculation apparatus and setting corresponding task dependence statuses in the procedure instance list and the procedure information list to invalid, where the procedure instance list includes a procedure name, a procedure identifier, a procedure instance identifier, an execution status, and a procedure start and end time, and the start and end time includes a start time and an end time; obtaining, according to a procedure definition, a task that starts to be first executed in each procedure in the procedure information list, to obtain a procedure instance in which the task that starts to be first executed is located and the task that starts to be executed and that is redone; and restarting to execute a source procedure according to the procedure instance in which the task that starts to be first executed is located and the task that starts to be executed and that is redone.

According to a third aspect, the disclosure provides an impact analysis calculation apparatus, including a receiving unit configured to receive an impact analysis request, where the impact analysis request includes a source procedure identifier, an impact start time, and an impact end time; a relationship list obtaining unit configured to obtain a dependency list and a procedure information list of a source procedure according to the source procedure identifier, where the dependency list includes a source procedure identifier, a target procedure identifier, and a subsequent procedure identifier, the procedure information list includes a source procedure identifier, a source task identifier, the target procedure identifier, the target task identifier, the subsequent procedure identifier, and the subsequent task identifier, the source task is a task included in the source procedure, the target procedure is a procedure directly affected by the source procedure or the source task, the target task is a task included in the target procedure, the subsequent procedure is a procedure directly affected by the target procedure or a task included in the target procedure, and the subsequent task is a task included in the subsequent procedure; a period obtaining unit configured to obtain a period of the source procedure and a period of the target procedure according to the source procedure identifier and according to the target procedure identifier in the dependency list; an instance list obtaining unit configured to obtain, according to the period of the source procedure, the period of the target procedure, the impact start time, and the impact end time, a procedure instance list corresponding to each procedure identifier included in the procedure instance list, where the procedure instance list includes a procedure name, a procedure identifier, a procedure instance identifier, an execution status, and a procedure start and end time, and the start and end time includes a start time and an end time; and a sending unit configured to send the procedure instance list and the procedure information list.

In a first possible implementation manner of the third aspect, the relationship list obtaining unit is configured to obtain, according to the source procedure identifier, an impact relationship list of procedures and tasks that are affected by a source procedure from the impact start time to the impact end time, where the impact relationship list includes a source procedure identifier, a source task identifier, a target procedure identifier, and a target task identifier; obtain a task impact list inside the source procedure according to the source procedure identifier, where the task impact list includes more than one source task identifier included in the source procedure; and obtain the dependency list and the procedure information list of the source procedure according to the impact relationship list and the task impact list.

In a second possible implementation manner of the third aspect, the instance list obtaining unit is configured to obtain an execution status of the source procedure and an execution status of the target procedure according to the impact start time and the impact end time of the source procedure when the period of the source procedure is the same as a period of the target procedure; obtain an execution status of the source procedure and execution statuses of target procedures in periods of all the target procedures from the impact start time to a current moment according to the impact start time and the impact end time of the source procedure when the period of the target procedure is shorter than the period of the source procedure; or obtain a data time of the target procedure and obtain an execution status of the source procedure and an execution status of the target procedure at the data time according to the impact start time and the impact end time when the period of the target procedure is longer than the period of the source procedure.

According to a fourth aspect, the disclosure further provides a one-click resetting apparatus, including a setting unit configured to obtain a procedure instance list and a procedure information list of an impact analysis request from an impact analysis calculation apparatus and set corresponding task dependence statuses in the procedure instance list and the procedure information list to invalid, where the procedure instance list includes a procedure name, a procedure identifier, a procedure instance identifier, an execution status, and a procedure start and end time, and the start and end time includes a start time and an end time; a redoing preparation unit configured to obtain, according to a procedure definition, a task that starts to be first executed in each procedure in the procedure information list, to obtain a procedure instance in which the task that starts to be first executed is located and the task that starts to be executed and that is redone; and a redoing execution unit configured to restart to execute a source procedure according to the procedure instance in which the task that starts to be first executed is located and the task that starts to be executed and that is redone.

In solutions of embodiments of the disclosure, all procedures and tasks that are directly or indirectly affected by a source procedure are obtained by means of analysis; in this way, one-time task redoing may be performed on these procedures and tasks, so as to lower an operation difficulty of operation and maintenance staff, reduce manual operation steps, and lower a misoperation rate.

BRIEF DESCRIPTION OF DRAWINGS

To describe the technical solutions in the embodiments of the disclosure more clearly, the following briefly describes the accompanying drawings required for describing the embodiments. The accompanying drawings in the following description show merely some embodiments of the disclosure, and a person of ordinary skill in the art may still derive other drawings from these accompanying drawings without creative efforts.

DESCRIPTION OF EMBODIMENTS

The following describes the technical solutions in the embodiments of the disclosure with reference to the accompanying drawings in the embodiments of the disclosure. The described embodiments are merely some but not all of the embodiments of the disclosure. All other embodiments obtained by a person of ordinary skill in the art based on the embodiments of the disclosure without creative efforts shall fall within the protection scope of the disclosure.

Figure 1:
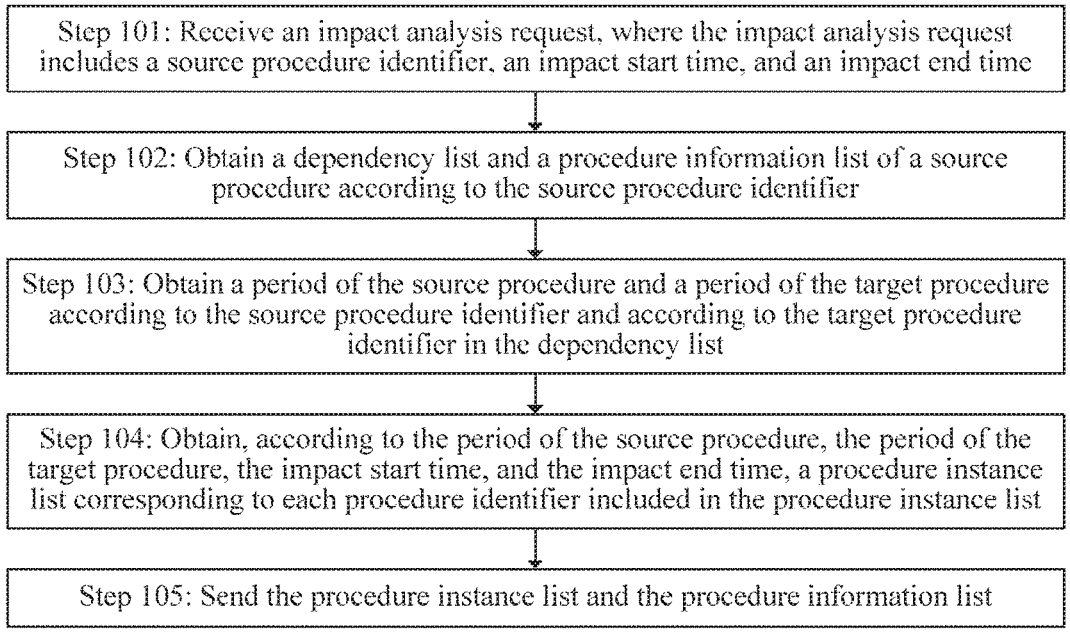
FIG. 1 is a schematic flowchart of an impact analysis-based task redoing method according to an embodiment of the disclosure.

FIG. 1 shows an impact analysis-based task redoing method according to an embodiment of the disclosure, where the method is applied to an impact analysis calculation apparatus and includes the following steps.

Step 101: Receive an impact analysis request, where the impact analysis request includes a source procedure identifier, an impact start time, and an impact end time.

Step 102: Obtain a dependency list and a procedure information list of a source procedure according to the source procedure identifier, where the dependency list includes a source procedure identifier, a target procedure identifier, and a subsequent procedure identifier, the procedure information list includes a source procedure identifier, a source task identifier, the target procedure identifier, the target task identifier, the subsequent procedure identifier, and the subsequent task identifier, the source task is a task included in the source procedure, the target procedure is a procedure directly affected by the source procedure or the source task, the target task is a task included in the target procedure, the subsequent procedure is a procedure directly affected by the target procedure or a task included in the target procedure, and the subsequent task is a task included in the subsequent procedure.

Step 103: Obtain a period of the source procedure and a period of the target procedure according to the source procedure identifier and according to the target procedure identifier in the dependency list.

Step 104: Obtain, according to the period of the source procedure, the period of the target procedure, the impact start time, and the impact end time, a procedure instance list corresponding to each procedure identifier included in the procedure instance list, where the procedure instance list includes a procedure name, a procedure identifier, a procedure instance identifier, an execution status, and a procedure start and end time, and the start and end time includes a start time and an end time.

Step 105: Send the procedure instance list and the procedure information list.

Optionally, obtaining a dependency list and a procedure information list of a source procedure according to the source procedure identifier includes obtaining, according to the source procedure identifier, an impact relationship list of procedures and tasks that are affected by a source procedure from the impact start time to the impact end time, where the impact relationship list includes a source procedure identifier, a source task identifier, a target procedure identifier, and a target task identifier; obtaining a task impact list inside the source procedure according to the source procedure identifier, where the task impact list includes more than one source task identifier included in the source procedure; and obtaining the dependency list and the procedure information list of the source procedure according to the impact relationship list and the task impact list.

Optionally, obtaining a task impact list inside the source procedure according to the source procedure identifier, where the task impact list includes more than one source task identifier included in the source procedure includes obtaining task impact lists of the source task and a subsequent task, of the source task, inside the source procedure when the impact analysis request further includes a source task identifier, where the task impact list includes the source task identifier and the subsequent task identifier.

Optionally, obtaining, according to the period of the source procedure, the period of the target procedure, the impact start time, and the impact end time, a procedure instance list corresponding to each procedure identifier comprised in the procedure instance list includes obtaining an execution status of the source procedure and an execution status of the target procedure according to the impact start time and the impact end time of the source procedure when the period of the source procedure is the same as a period of the target procedure; obtaining an execution status of the source procedure and execution statuses of target procedures in periods of all the target procedures from the impact start time to a current moment according to the impact start time and the impact end time of the source procedure when the period of the target procedure is shorter than the period of the source procedure; or obtaining a data time of the target procedure and obtaining an execution status of the source procedure and an execution status of the target procedure at the data time according to the impact start time and the impact end time when the period of the target procedure is longer than the period of the source procedure.

Optionally, sending the procedure instance list and the procedure information list includes sending the procedure instance list and the procedure information list to the one-click resetting apparatus, so that the one-click resetting apparatus redoes a task; or displaying the procedure instance list and the procedure information list.

Figure 2:
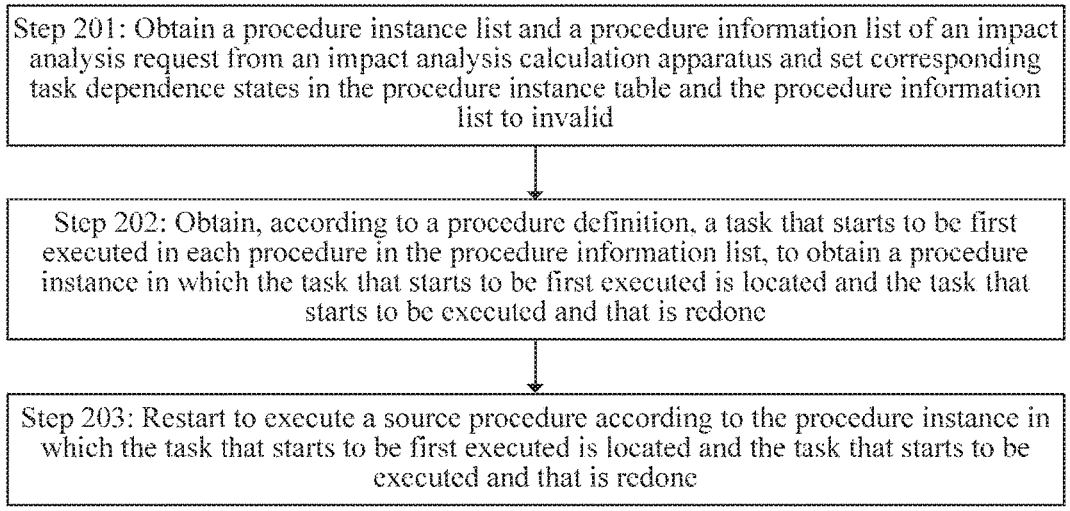
FIG. 2 is a schematic flowchart of another impact analysis-based task redoing method according to an embodiment of the disclosure.

FIG. 2 shows an impact analysis-based task redoing method according to an embodiment of the disclosure, where the method is applied to a one-click resetting apparatus and includes the following steps.

Step 201: Obtain a procedure instance list and a procedure information list of an impact analysis request from an impact analysis calculation apparatus and set corresponding task dependence statuses in the procedure instance list and the procedure information list to invalid, where the procedure instance list includes a procedure name, a procedure identifier, a procedure instance identifier, an execution status, and a procedure start and end time, and the start and end time includes a start time and an end time.

Step 202: Obtain, according to a procedure definition, a task that starts to be first executed in each procedure in the procedure information list, to obtain a procedure instance in which the task that starts to be first executed is located and the task that starts to be executed and that is redone.

Step 203: Restart to execute a source procedure according to the procedure instance in which the task that starts to be first executed is located and the task that starts to be executed and that is redone.

Figure 3:
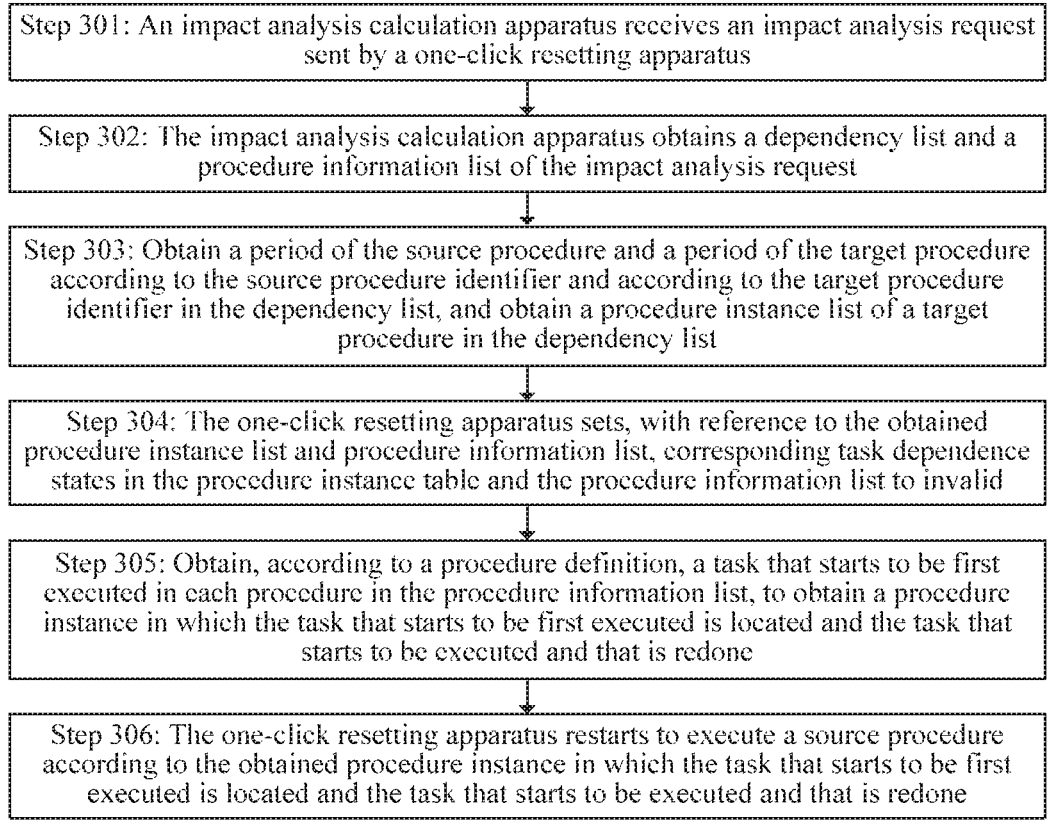
FIG. 3 is a schematic flowchart of another impact analysis-based task redoing method according to an embodiment of the disclosure.

FIG. 3 shows an impact analysis-based task redoing method according to an embodiment of the disclosure, which includes the following steps.

Step 301: An impact analysis calculation apparatus receives an impact analysis request sent by a one-click resetting apparatus, where the impact analysis request includes a source procedure identifier, an impact start time, and an impact end time, and the impact analysis request may further include a source task identifier.

Step 302: The impact analysis calculation apparatus obtains a dependency list and a procedure information list of the impact analysis request, where the dependency list includes a source procedure identifier, a target procedure identifier, and a subsequent procedure identifier, the procedure information list includes a source procedure identifier, a source task identifier, the target procedure identifier, the target task identifier, the subsequent procedure identifier, and the subsequent task identifier, the source task is a task included in the source procedure, the target procedure is a procedure directly affected by the source procedure or the source task, the target task is a task included in the target procedure, the subsequent procedure is a procedure directly affected by the target procedure or a task included in the target procedure, and the subsequent task is a task included in the subsequent procedure. Step 302 includes:

(a): Obtain, from a database according to the source procedure identifier in the impact analysis request, an impact relationship list of all procedures and tasks that are affected by the source procedure from impact start time to the impact end time. The impact relationship list includes a source procedure identifier, a source task identifier, a target procedure identifier, and a target task identifier. In this embodiment of the disclosure, an impact analysis object may be a procedure. In this case, the procedure is the source procedure, a procedure and a task that is affected by the source procedure is the target procedure and the target task. An impact analysis object may also be a task. In this case, the task is the source task. A procedure in this embodiment of the disclosure may be used as the source procedure or may be used as the target procedure. For example, when procedure 2 is used as an impact analysis object, procedure 2 is the source procedure; when procedure 2 is used as a procedure affected by an impact analysis object, that is, procedure 1, procedure 2 is the target procedure. Similarly, a task may be used as the source task or may be used as the target task.

(b): Obtain a task impact list inside the source procedure from the database according to the source procedure identifier. If the impact analysis request includes a source task identifier, the task impact list includes a source task identifier and a subsequent task identifier of a subsequent task of the source task in the procedure. For example, the following task dependencies exist in the source procedure: task 1 depends on task 2, and task 2 depends on task 3. If the source task is task 2, a subsequent task of task 2 in the procedure is task 3, and the task impact list includes task 2 and task 3. If the impact analysis request does not include any source task identifier, all tasks in the procedure need to be obtained, that is, the task impact list includes all tasks of the source procedure. The task impact list of the source procedure is put into a procedure information list flowlistA, whereby flowlistA is empty at first, in an analysis process, procedures and tasks that are directly affected or indirectly affected by the source procedure and the source task are gradually added.

(c): Obtain the dependency list and the procedure information list of the impact analysis request according to the impact relationship list and the task impact list.

All relationships in which source task identifiers are not empty and source task identifiers are not included in the task impact list are removed from the impact relationship list, to obtain a target procedure task matching table. It is assumed that the target procedure task matching table is mapA, where a keyword (key) of the target procedure task matching table is a target procedure identifier, and a value is a task list affected in the target procedure. For example, the mapA includes {target procedure identifier, task list affected by target procedure}. In addition, content in the mapA is updated to the procedure information list flowlistA, and a dependency list mapB is constructed. The procedure information list includes a source procedure identifier and a task identifier of an affected task thereof, and a target procedure identifier and a task identifier of an affected task thereof. The dependency list includes information about a relationship between the source procedure identifier and the target procedure identifier thereof. The dependency list may be {identifier of source procedure 1: {{identifier of target procedure 1: {task}}; {identifier of target procedure 2: {task}}}; identifier of source procedure 2: {identifier of target procedure 2: {task}}}. The procedure information list is {procedure 1: {task 1; task 2; task 3}}; procedure 2: {task 4, task 5 }}; {procedure 3: {task 5}}}.

(d): Analyze, according to an obtained target procedure task matching table and according to the foregoing step 201 to step 203, all target procedures and target task identifiers that are affected by the procedure identifiers and task identifiers in mapA, to obtain the final dependency list and procedure information list.

Step 303: Obtain a period of the source procedure and a period of the target procedure according to the source procedure identifier and according to the target procedure identifier in the dependency list. In addition, a start and end time of each source procedure, a start and end time of each target procedure, and an execution status in the start and end time are obtained according to the impact start time and the impact end time of the source procedure. The start and end time may include a start time and an end time, so as to obtain a procedure instance list of a target procedure in the dependency list, where the procedure instance list includes a procedure name, a procedure identifier, a procedure instance identifier, an execution status, and a start and end time. Certainly, procedure instance lists of each obtained source procedure and the target procedure may be displayed.

Obtaining period information of the source procedure and the target procedure includes, if a period of the source procedure in the impact analysis request is the same as a period of the target procedure, or if a target scheduling plan does not exist, it is considered that the period of the source procedure is the same as a target period, and an execution status of the procedure is obtained according to a data impact start time of the source procedure. If the target procedure has a shorter period than the source procedure, an execution status in a short period closest to a long period is obtained according to that a short period depends on a long period, for example, a day depends on a month. If the target period is longer than the period of the source procedure, according to that a long period depends on a short period, a data time of a long period is calculated according to a calculation rule, and an execution status of a procedure thereof is obtained.

Herein, a period calculation manner is in a correspondence to a data time. A data time is first associated with a time. For example, in minute scheduling, a data time is accurate to minute/hour/date/month/year; in month scheduling, a data time is represented by month/year, such as October, 2014; and in day scheduling, a rule for a data time is date/month/year, such as Oct. 1, 2014. In this way, when a long period is calculated according to a short period, a rule for a long period may be directly captured and obtained. When a long period is calculated depending on a short period, a short period is captured as a long period, and then one long period is added, so as to perform processing and calculation.

Step 304: The one-click resetting apparatus sets, with reference to the obtained procedure instance list and procedure information list, corresponding task dependence statuses in the procedure instance list and the procedure information list to invalid. In this way, when a task depending on the procedure is executed, the task is always in a waiting state.

Step 305: The one-click resetting apparatus obtains, according to a procedure definition, a task that starts to be first executed in each procedure in the procedure information list, to obtain a procedure instance in which the task that starts to be first executed is located and the task that starts to be executed and that is redone.

Step 306: The one-click resetting apparatus restarts to execute a source procedure according to the obtained procedure instance in which the task that starts to be first executed is located and the task that starts to be executed and that is redone. If no task is appointed, execution starts from a start node of an input procedure. If a task is appointed, execution starts from an appointed task.

In a solution of this embodiment of the disclosure, all procedures and tasks that are directly or indirectly affected by a source procedure are obtained by means of analysis; in this way, one-time task redoing may be performed on these procedures and tasks, so as to lower an operation difficulty of operation and maintenance staff, reduce manual operation steps, and lower a misoperation rate.

Figure 4:
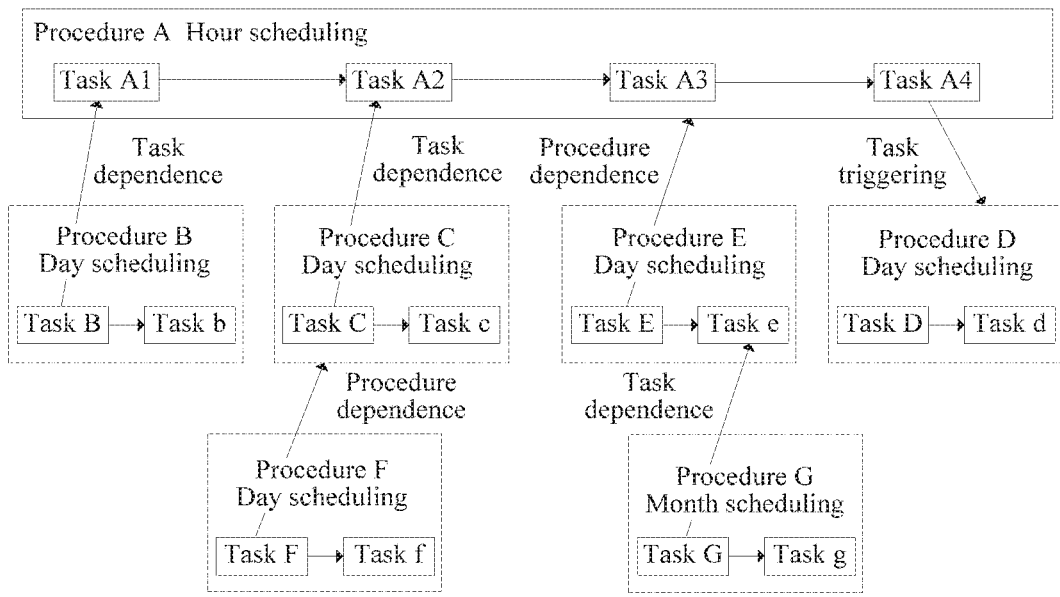
FIG. 4 is a schematic diagram of an impact relationship between tasks of one specific example according to an embodiment of the disclosure.

The foregoing execution process of the impact analysis calculation apparatus is described below by using a specific example. As shown in FIG. 4, it is assumed that procedure F depends on procedure C; procedure G depends on procedure E; procedure B, procedure C, procedure D, and procedure E separately depend on procedure A, where procedure A is scheduled once per hour, procedure B, procedure C, procedure D. procedure E, and procedure F are scheduled once per day, procedure G is scheduled once per month. Specific dependencies between procedures and tasks are shown in FIG. 2 and are shown in the Table below.

| Source procedure | Source task | Target procedure | Target task | Relationship type |
|---|---|---|---|---|
| A | task A1 | B | task B | dependence |
| A | task A2 | C | task C | dependence |
| A | task A4 | D | empty | trigger |
| A | empty | E | task E | dependence |
| C | empty | F | task F | dependence |
| E | task e | G | empty | dependence |

Task G of procedure G depends on task e of procedure E, task e depends on task E, task E depends on entire procedure A, and task C of procedure E is executed only after entire procedure A ends. Task F of procedure F depends on entire procedure C, task B of procedure B depends on task A1 of procedure A, task C of procedure C depends on task A2 of procedure A, and procedure D depends on task A4 of procedure A.

It is assumed that impact analysis of task A2 of procedure A from a moment 1 to a moment 2 for other procedures and tasks needs to be checked, that is, the source procedure is procedure A, and the source task is task A2.

Other procedures affected by procedure A are obtained to obtain an impact relationship list A. Impact relationship list A includes four records of target procedures being B, C, D, and E, namely {A: {B: {task B}}, {C: {task C}}, {D: {empty}}, {E: {task E}}}.

Task A2 of procedure A and subsequent task A3 and task A4 of task A2 are obtained to obtain task impact list A, where task impact list A includes {A: {task A2, task A3, task A4}}. In this case, procedure information list list A includes the foregoing impact task list A.

All relationships in which source task identifiers are not empty, and source task identifiers are not included in the task impact list are removed from impact relationship list A, that is, records of procedure B in impact relationship list A are removed from records depending on task A1. In this way, a first-hierarchy target procedure task matching table mapA is obtained after filtering. Key values in mapA are respectively C, D, and E, values are respectively {task C}, {empty}, and {task E}, that is, mapA is {{{C: {task C}}; {D: {empty}}; {E: {task E}}}. In addition, mapA is updated to procedure information list flowlistA. Procedure information list flowlistA includes a target procedure identifier and a task list, and a dependency list mapB is constructed. MapB is {A: {{{{C: {task C}}; {D: {empty} }; {E: {task E}}}}. FlowlistA includes {A: {task A2; task A3; task A3}}}}; C: {task C}}; {D: {empty}}; {E: {task E}}}.

Impact analysis is performed on procedure C according to information in the mapA and according to the foregoing method, and flowlistA and mapB are updated, to obtain updated flowlistA {A: {task A2; task A3; task A3}}; C: {task C, task c}}; {D: {empty}} }; {E: {task E}}} and updated mapB {A: {C: {task C}}; {D: {empty}}; {E: {task E}}}, {C: {F: {task F}}}}. Impact analysis is performed on procedure D. Because procedure D does not affect other tasks and procedures, flowlistA and mapB do not need to be updated. Impact analysis is performed on procedure E, and flowlistA and mapB are updated, to obtain updated flowlistA {A: {task A2; task A3; task A3}}; C: {task C, task c}}; {D: {empty}}; {E: {task E, task e}}} and updated mapB {A: {C: {task C}}; {D: {empty}}; {E: {task E}}}, {C: {F: {task F}}}, {E: {G: {task G}}}}.

According to the foregoing method, target procedures and tasks that are directly affected or indirectly affected by each source procedure and each source task are found, to obtain final flowlistA: {A: {task A2; task A3; task A4}}; {C: {task C; task c}}; {D: {empty}}, {E: {task E; task e}; {F: {task F, task f}}; {G: {task G, task g}} and mapB{A: {{C: {task C}}; {D: {empty}}; {E: {taskE}}}}; {C: {{F: {task}}}}; {E: {{G: {taskG}}}}}).

In this way, all dependency lists and procedure information lists from moment 1 to moment 2 may be obtained. Then the periods of the source procedure and the target procedure are obtained according to the source procedure identifier and according to the target procedure identifier in the dependency list. Each start and end time of the source procedure and each start and end time of the target procedure and an execution status of a corresponding procedure are obtained according to moment 1 and moment 2. The execution status of the procedure herein may include succeeding in execution, failing in execution, and the like.

Figure 5:
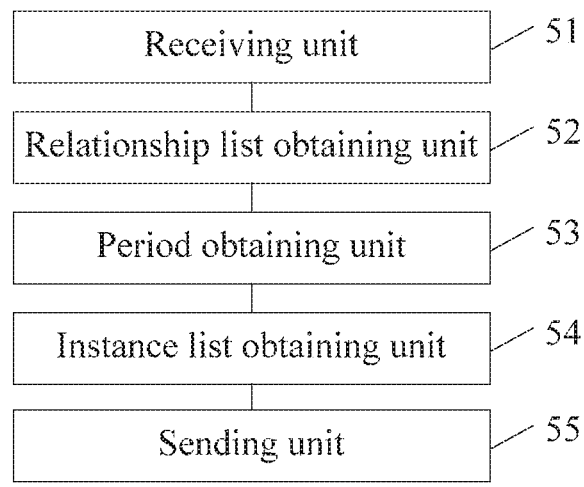
FIG. 5 is a schematic structural diagram of an impact analysis calculation apparatus according to an embodiment of the disclosure.

As shown in FIG. 5, an embodiment of the disclosure provides an impact analysis calculation apparatus, including a receiving unit 51 configured to receive an impact analysis request, where the impact analysis request includes a source procedure identifier, an impact start time, and an impact end time; a relationship list obtaining unit 52 configured to obtain a dependency list and a procedure information list of a source procedure according to the source procedure identifier, where the dependency list includes a source procedure identifier, a target procedure identifier, and a subsequent procedure identifier, the procedure information list includes a source procedure identifier, a source task identifier, the target procedure identifier, the target task identifier, the subsequent procedure identifier, and the subsequent task identifier, the source task is a task included in the source procedure, the target procedure is a procedure directly affected by the source procedure or the source task, the target task is a task included in the target procedure, the subsequent procedure is a procedure directly affected by the target procedure or a task included in the target procedure, and the subsequent task is a task included in the subsequent procedure; a period obtaining unit 53 configured to obtain a period of the source procedure and a period of the target procedure according to the source procedure identifier and according to the target procedure identifier in the dependency list; an instance list obtaining unit 54 configured to obtain, according to the period of the source procedure, the period of the target procedure, the impact start time, and the impact end time, a procedure instance list corresponding to each procedure identifier included in the procedure instance list, where the procedure instance list includes a procedure name, a procedure identifier, a procedure instance identifier, an execution status, and a procedure start and end time, and the start and end time includes a start time and an end time; and a sending unit 55 configured to send the procedure instance list and the procedure information list.

Optionally, the relationship list obtaining unit 52 is configured to obtain, according to the source procedure identifier, an impact relationship list of procedures and tasks that are affected by a source procedure from the impact start time to the impact end time, where the impact relationship list includes a source procedure identifier, a source task identifier, a target procedure identifier, and a target task identifier; obtain a task impact list inside the source procedure according to the source procedure identifier, where the task impact list includes more than one source task identifier included in the source procedure; and obtain the dependency list and the procedure information list of the source procedure according to the impact relationship list and the task impact list.

Optionally, the instance list obtaining unit 54 is configured to obtain an execution status of the source procedure and an execution status of the target procedure according to the impact start time and the impact end time of the source procedure when the period of the source procedure is the same as a period of the target procedure; obtain execution statuses of target procedures in periods of all the target procedures from the impact start time to a current moment according to the impact start time and the impact end time of the source procedure when the period of the target procedure is shorter than the period of the source procedure; or obtain a data time of the target procedure and obtain an execution status of the target procedure at the data time according to the impact start time and the impact end time when the period of the target procedure is longer than the period of the source procedure.

Figure 6:
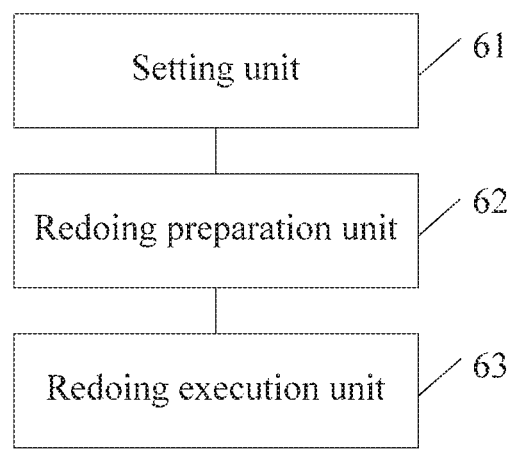
FIG. 6 is a schematic structural diagram of a one-click resetting apparatus according to an embodiment of the disclosure.

As shown in FIG. 6, an embodiment of the disclosure provides a one-click resetting apparatus, including a setting unit 61 configured to obtain a procedure instance list and a procedure information list of an impact analysis request from an impact analysis calculation apparatus and set corresponding task dependence statuses in the procedure instance list and the procedure information list to invalid, where the procedure instance list includes a procedure name, a procedure identifier, a procedure instance identifier, an execution status, and a procedure start and end time, and the start and end time includes a start time and an end time; a redoing preparation unit 62 configured to obtain, according to a procedure definition, a task that starts to be first executed in each procedure in the procedure information list, to obtain a procedure instance in which the task that starts to be first executed is located and the task that starts to be executed and that is redone; and a redoing execution unit 63 configured to restart to execute a source procedure according to the procedure instance in which the task that starts to be first executed is located and the task that starts to be executed and that is redone.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include: a magnetic disk, an optical disc, a read-only memory (ROM), a random access memory (RAM), or the like.

What is disclosed above is merely exemplary embodiments of the disclosure, and is not intended to limit the protection scope of the disclosure. Therefore, equivalent variations made in accordance with the claims of the disclosure shall fall within the scope of the disclosure.

What is claimed is:

1. An impact analysis-based task redoing method, comprising:

receiving an impact analysis request for a source task in a source procedure, the impact analysis request comprising a source procedure identifier, an impact start time, and an impact end time;

obtaining, according to the source procedure identifier, an impact relationship list for procedures and tasks that are affected by the source procedure from the impact start time to the impact end time, the impact relationship list comprising first information of how the source task affects other source tasks that are dependent on the source task and second information of how the source task affects a target procedure;

obtaining a dependency list and a procedure information list of the source procedure according to the impact relationship list, the dependency list comprising the source procedure identifier, a target procedure identifier, and a subsequent procedure identifier, the procedure information list comprising the source procedure identifier, a source task identifier, the target procedure identifier, a target task identifier, the subsequent procedure identifier, and a subsequent task identifier, the source task being a task in the source procedure, the target procedure being a procedure directly affected by the source procedure or the source task, a target task being a task in the target procedure, a subsequent procedure being a procedure directly affected by the target procedure or a task in the target procedure, and a subsequent task being a task in the subsequent procedure;

obtaining a period of the source procedure and a period of the target procedure according to the source procedure identifier and the target procedure identifier in the dependency list;

obtaining, according to the period of the source procedure, the period of the target procedure, the impact start time, and the impact end time, a procedure instance list corresponding to each procedure identifier in the procedure instance list, the procedure instance list comprising a procedure name, a procedure identifier, a procedure instance identifier, an execution status of the target procedure that indicates whether the target procedure executed successfully, and a procedure start time and an end time, and the procedure start time and the end time comprising a start time and an end time respectively; and sending the procedure instance list and the procedure information list to a one-click resetting apparatus so as to obtain a task that first starts execution in each procedure in the procedure information list, so as to obtain a procedure instance in a location of the task that first starts execution and the task that starts execution is redone, and so as to restart execution of the source procedure according to the procedure instance in the location of the task that first starts execution is located and the task that starts execution is redone.

2. The impact analysis-based task redoing method according to claim 1, wherein the impact relationship list comprises the source procedure identifier, the source task identifier, the target procedure identifier, and the target task identifier, and obtaining the dependency list and the procedure information list of the source procedure comprising:

obtaining a task impact list inside the source procedure according to the source procedure identifier, the task impact list comprising more than one source task identifier in the source procedure; and obtaining the dependency list and the procedure information list of the source procedure according to the impact relationship list and the task impact list.

3. The impact analysis-based task redoing method according to claim 2, wherein obtaining the task impact list inside the source procedure comprises obtaining task impact lists of the source task and the subsequent task, of the source task, inside the source procedure when the impact analysis request further comprises the source task identifier, and the task impact list comprising the source task identifier and the subsequent task identifier.

4. The impact analysis-based task redoing method according to claim 1, wherein obtaining the period of the target procedure, the impact start time, and the impact end time comprises obtaining an execution status of the source procedure and the execution status of the target procedure according to the impact start time and the impact end time of the source procedure when the period of the source procedure is same as a scheduling period of the target procedure.

5. The impact analysis-based task redoing method according to claim 1, further comprising:

obtaining the procedure instance list and the procedure information list of the impact analysis request from an impact analysis calculation apparatus; and setting corresponding task dependence statuses in the procedure instance list and the procedure information list to invalid.

6. The impact analysis-based task redoing method according to claim 1, wherein obtaining the period of the target procedure, the impact start time, and the impact end time comprises obtaining an execution status of the source procedure and execution statuses of target procedures in periods of all the target procedures from the impact start time to a current moment according to the impact start time and the impact end time of the source procedure when the period of the target procedure is shorter than the period of the source procedure.

7. The impact analysis-based task redoing method according to claim 1, wherein obtaining the period of the target procedure, the impact start time, and the impact end time comprises obtaining a data time of the target procedure and obtaining an execution status of the source procedure and the execution status of the target procedure at the data time according to the impact start time and the impact end time when the period of the target procedure is longer than the period of the source procedure.

8. The impact analysis-based task redoing method according to claim 1, wherein sending the procedure instance list and the procedure information list comprises displaying the procedure instance list and the procedure information list.

9. An impact analysis calculation apparatus, comprising:
a memory storing instructions; and
a processor coupled to the memory, the instructions causing the processor to be configured to:
receive an impact analysis request for a source task in a source procedure, the impact analysis request comprising a source procedure identifier, an impact start time, and an impact end time;
obtain, according to the source procedure identifier, an impact relationship list for procedures and tasks that are affected by the source procedure from the impact start time to the impact end time, the impact relationship list comprising first information of how the source task affects other source tasks of the source procedure that are dependent on the source task and second information of how the source task affects a target procedure;
obtain a dependency list and a procedure information list of the source procedure according to the impact relationship list, the dependency list comprising the source procedure identifier, a target procedure identifier, and a subsequent procedure identifier, the procedure information list comprising the source procedure identifier, a source task identifier, the target procedure identifier, a target task identifier, the subsequent procedure identifier, and a subsequent task identifier, a source task being a task in the source procedure, the target procedure being a procedure directly affected by the source procedure or the source task, a target task being a task in the target procedure, a subsequent procedure being a procedure directly affected by the target procedure or a task in the target procedure, and a subsequent task being a task in the subsequent procedure;
obtain a period of the source procedure and a period of the target procedure according to the source procedure identifier and the target procedure identifier in the dependency list;
obtain, according to the period of the source procedure, the period of the target procedure, the impact start time, and the impact end time, a procedure instance list corresponding to each procedure identifier in the procedure instance list, the procedure instance list comprising a procedure name, a procedure identifier, a procedure instance identifier, an execution status of the target procedure that indicates whether the procedure executed successfully, and a procedure start time and a procedure end time, and the procedure start time and the procedure end time comprising a start time and an end time respectively; and
send the procedure instance list and the procedure information list to a one-click resetting apparatus so as to obtain a task that first starts execution in each procedure in the procedure information list, so as to obtain a procedure instance in a location of the task that first starts execution and the task that starts execution is redone, and so as to restart execution of the source procedure according to the procedure instance in the location of the task that first starts execution is located and the task that starts execution is redone.

10. The impact analysis calculation apparatus according to claim 9, wherein the impact relationship list comprises the source procedure identifier, the source task identifier, the target procedure identifier, and the target task identifier, and the instructions further causing the processor to be configured to: obtain a task impact list inside the source procedure according to the source procedure identifier, the task impact list comprising more than one source task identifier in the source procedure; and
obtain the dependency list and the procedure information list of the source procedure according to the impact relationship list and the task impact list.

11. The impact analysis calculation apparatus according to claim 9, wherein the instructions further cause the processor to be configured to obtain an execution status of the source procedure and the execution status of the target procedure according to the impact start time and the impact end time of the source procedure when the period of the source procedure is a same period of the target procedure.

12. The impact analysis calculation apparatus according to claim 9, wherein the instructions further cause the processor to be configured to obtain an execution status of the source procedure and execution statuses of target procedures in periods of all the target procedures from the impact start time to a current moment according to the impact start time and the impact end time of the source procedure when the period of the target procedure is shorter than the period of the source procedure.

13. The impact analysis calculation apparatus according to claim 9, wherein the instructions further cause the processor to be configured to obtain a data time of the target procedure and obtain an execution status of the source procedure and the execution status of the target procedure at the data time according to the impact start time and the impact end time when the period of the target procedure is longer than the period of the source procedure.

* * * * *